United States Patent [19]
Lucore, II

[11] Patent Number: 5,050,995
[45] Date of Patent: Sep. 24, 1991

[54] JET AGITATION SYSTEM
[75] Inventor: James C. Lucore, II, Arlington, Va.
[73] Assignee: High Pressure Technology Corp., Arlington, Va.
[21] Appl. No.: 431,338
[22] Filed: Nov. 3, 1989
[51] Int. Cl.⁵ .......................... B01F 15/02; B01F 5/18
[52] U.S. Cl. .................................. 366/136; 134/169 R; 134/171; 239/142; 366/165
[58] Field of Search ............... 366/136, 137, 165, 150, 366/173, 167; 134/169 R, 171; 239/142, 127; 222/318; 137/592, 896

[56] References Cited

U.S. PATENT DOCUMENTS

| | | | |
|---|---|---|---|
| 2,878,617 | 3/1959 | Finn | 47/1 |
| 2,980,122 | 4/1961 | Zylstra | 134/169 R |
| 2,988,286 | 6/1961 | Snyder et al. | 239/124 |
| 3,125,294 | 3/1964 | Lill | 239/77 |
| 3,143,295 | 8/1964 | Booker | 239/142 |
| 3,147,922 | 9/1964 | Warner | 239/127 |
| 3,337,189 | 8/1967 | Brown et al. | 239/127 |
| 3,459,375 | 8/1969 | Goffin | 239/127 |
| 3,463,397 | 8/1969 | Mecklin et al. | 239/126 |
| 3,491,949 | 1/1970 | Hairston | 239/127 |
| 3,512,713 | 5/1970 | Carlyon, Jr. | 239/127 |
| 3,638,860 | 2/1972 | Carlyon, Jr. | 239/127 |
| 3,658,258 | 4/1972 | Carlyon, Jr. | 239/662 |
| 4,216,907 | 8/1980 | Fuller | 239/127 |
| 4,447,157 | 5/1984 | Underwood | 366/137 |
| 4,723,710 | 2/1988 | Lucore, II | 239/124 |

Primary Examiner—Robert W. Jenkins
Attorney, Agent, or Firm—Longacre & White

[57] ABSTRACT

A jet agitation system for preparation of agricultural seeding and other fluids ensures breakdown of mulch clumps and complete mixing of the seed-mulch-water mixture. The jet agitation system includes a tank with an access port at the top, a non-clogging pump coupled to withdraw the mixture from the bottom of the tank, a spray head and control valves terminating supply and return hoses and a manifold for distributing fluid to a plurality of nozzles or jets disposed within the tank. The jets are preferably positioned above the fluid level and expel liquid under pressure which breaks down the paper mulch and circulates the fluid in the tank, thereby fully mixing it. Fluid may be supplied to the nozzles or jets during spraying in order to maintain the mixture in a fully mixed state.

19 Claims, 3 Drawing Sheets

JET AGITATION SYSTEM

BACKGROUND OF THE INVENTION

The invention relates generally to apparatus for mixing and dispersing fluid based products and more specifically to an apparatus for mixing seeds, a retaining media such as paper mulch and water prior to application to soil for planting, landscaping and related purposes.

Agricultural and landscaping apparatus for applying mixtures of seed, mulch, fertilizers and water, i.e., hydroseeding apparatus, are well known. They facilitate the rapid and uniform application of a particular hydroseeding mixture. The seed may be grass or other ground cover. The mulch retains the seeds until they germinate and take root, preventing displacement by water flow from rain. The fertilizer enhances the seeds growth and the water serves the dual capacity of a dispersing medium and supporting prompt germination of the seeds.

A typical spraying apparatus includes a truck or trailer mounted tank for holding the mixture, a pump for delivering the mixture, a spray nozzle for dispersing the mixture and fluid conduits including flexible hoses for coupling the tank, pump and nozzle. Often times, such apparatus include by-pass or return lines from the spray nozzle to the tank such that a portion of the pumped fluid may be returned to the tank. Such recirculation inhibits settling of certain mixture constituents and improves the uniformity of the mixture delivered to the nozzle.

U.S. Pat. Nos. 2,878,617 to Finn, 3,147,922 to Warner, 3,512,713 and 3,638,862 to Carlyon, Jr. all disclose vehicle mounted agricultural apparatus for spraying mixtures of solid and liquid materials including seed, mulch, fertilizer and water having a tank, a pump, hoses and a discharge nozzle. These prior art systems are provided with valves which facilitate recirculation of a portion or all of the mixture delivered by the pump.

One of the significant problems of this general class of equipment relates to the clogging of the delivery nozzle. Inasmuch as the nozzle must represent a certain restriction in order to produce a spray which disperses the mixture over a reasonably large area, clogging of the nozzle is a common problem. I have addressed this problem in my previously issued U.S. Pat. No. 4,723,710, granted Feb. 9, 1988. The apparatus disclosed therein includes a pair of valves which are utilized to adjust the amount of mixture returned through two separate return lines.

A second difficulty with such apparatus is the initial preparation of the mixture. Whereas the seeds and fertilizer, if used, generally readily mix with the water in the tank, the mulch, that is, the material which forms the seed retaining medium on the soil, generally does not. A typical mulch product nowadays is a paper fiber product. Not surprisingly, the density of the product is such that it will initially float upon the surface of the water and generally resist mixing with the water. However, when clumps of paper fiber mulch have absorbed water they readily sink to the bottom of the tank and, again, resist mixing.

The present invention is directed to an apparatus for ensuring that the constituents of an agricultural seeding mixture, particularly the paper fiber mulch is broken down into functionally sized flakes and fibers suitable for application to the soil and incapable of clogging the various hoses, ports and valves of the mixture dispersing apparatus. Broadly, the invention relates to an apparatus for mixing solid and fluid constituents by jet agitation and maintaining the uniformity of the mixture in the same manner.

SUMMARY OF THE INVENTION

A jet agitation system for preparation of agricultural seeding and other fluids ensures breakdown of mulch clumps or other solid material and complete mixing of the mixture constituents. The jet agitation system includes a tank with an access port at the top, a non-clogging pump coupled to withdraw the mixture from the bottom of the tank, a spray head and control valves terminating supply and return hoses and a manifold for distributing fluid to a plurality of nozzles or jets disposed within the tank. The jets are preferably positioned both above and below the fluid level in the tank and expel liquid under pressure which breaks down the paper mulch or other material and circulates the fluid in the tank, thereby fully mixing it. In an alternate embodiment, the jets positioned above the fluid level are coupled to a first manifold and the jets positioned below the fluid level are coupled to a second manifold. Flow and discharge rates through the manifolds and jets may be independently adjusted to enhance mixing or circulation. Fluid may be supplied to the nozzles or jets during spraying in order to maintain the mixture in a fully mixed state.

DESCRIPTION OF THE PREFERRED EMBODIMENT

Figure 1:
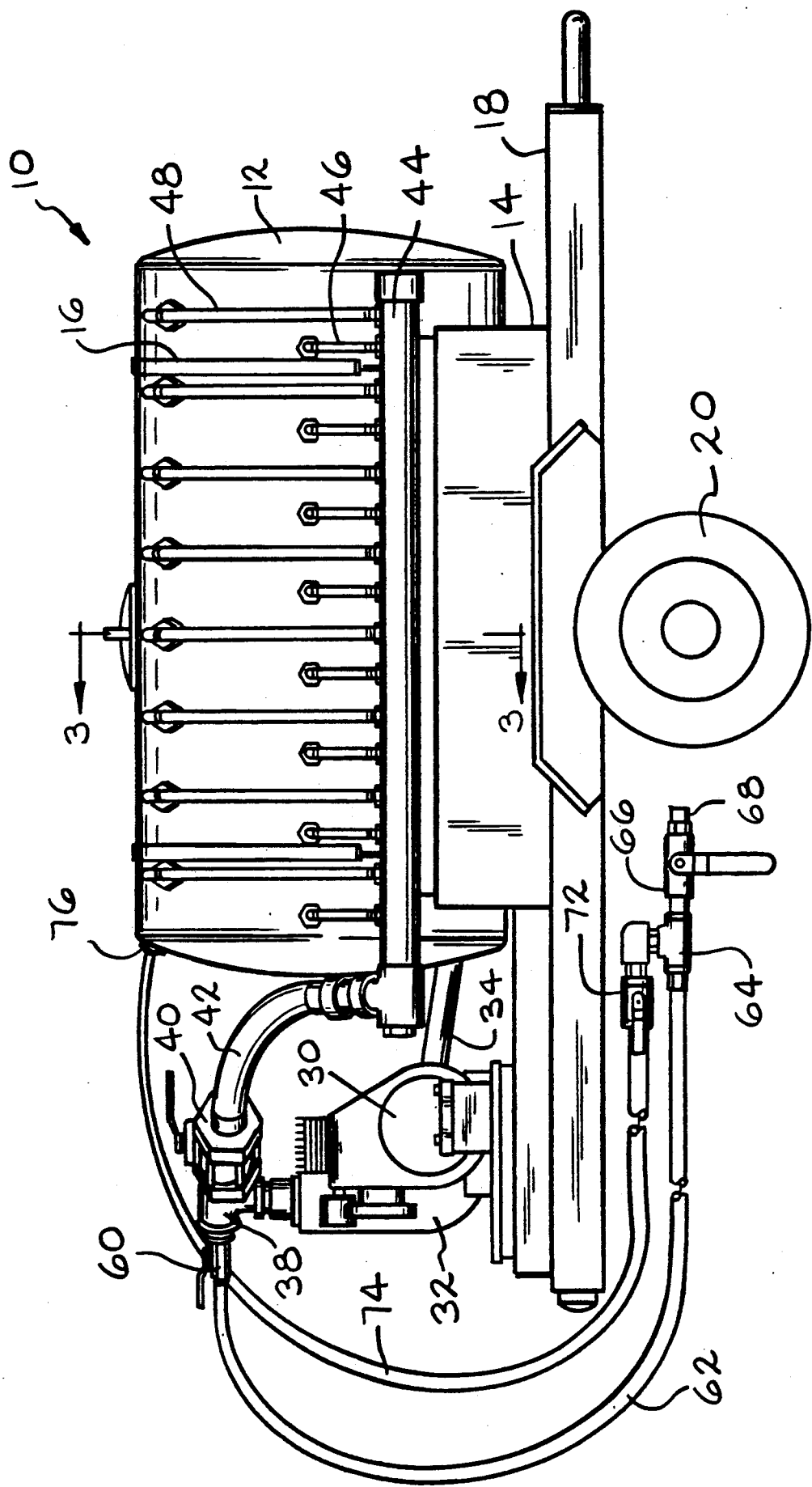
FIG. 1 is a side elevational view of a mixing and dispersing apparatus according to the present invention.
Figure 3:
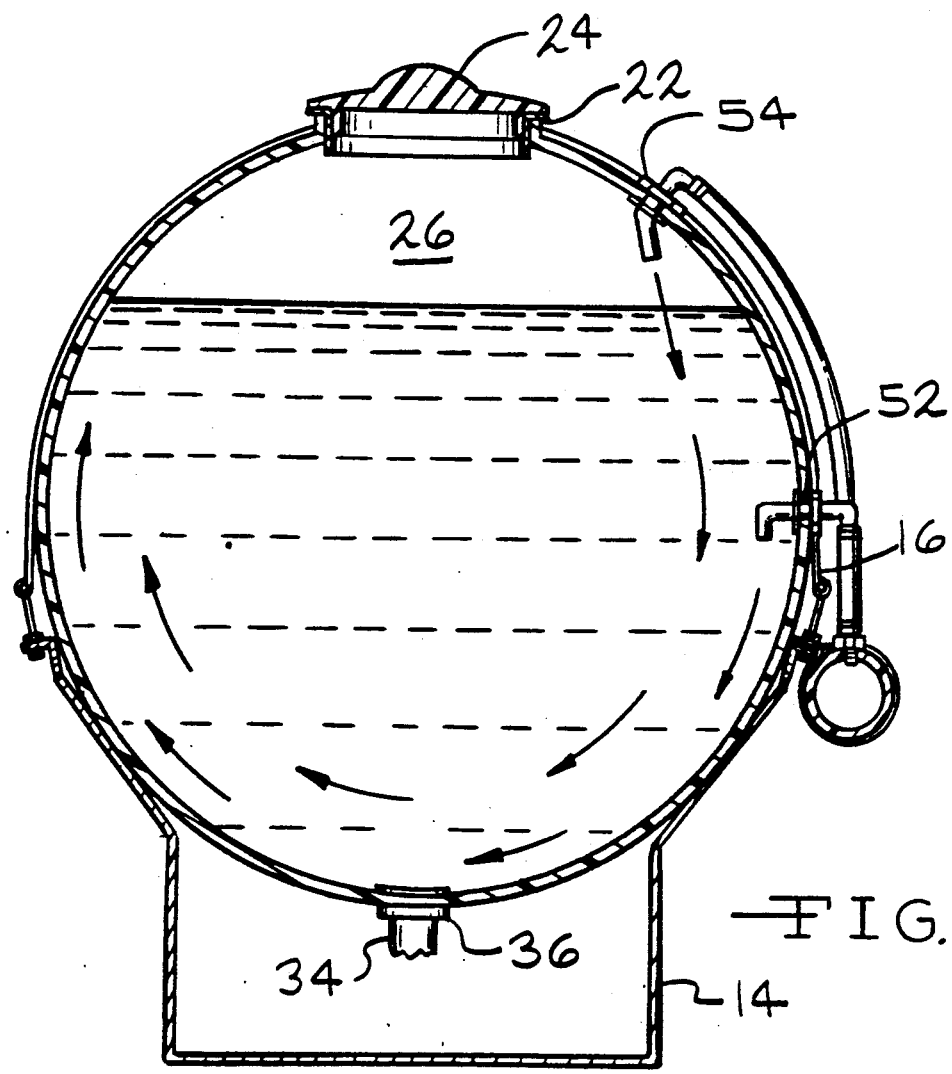
FIG. 3 is full, sectional view of a mixing and dispersing apparatus according to the present invention taken along line 3—3 of FIG. 1.

Referring now to FIGS. 1 and 3, an apparatus for the mixing and dispersing of fluid based mixtures is illustrated and generally designated by the reference numeral 10. The apparatus 10 includes a holding tank 12 supported by and received within an elongate yoke structure 14. The holding tank 12 is preferably elongate and cylindrical in shape, and defines an axis. The tank 12 may be fabricated of metal or any suitable lightweight material such as fiberglass reinforced plastic or polyvinyl chloride, for example. The holding tank 12 defines a volume of at least 100 gallons and preferably 200 gallons or more. The holding tank 12 is secured to the yoke structure 14 by a plurality of strap fasteners 16. The holding tank 12 and yoke structure 14 are in turn received upon a platform 18. The holding tank 12 and yoke structure 16 may be either permanently or removably secured to the platform 18. The platform 18 may be the bed of a trailer, as illustrated, having conventional wheels 20 to provide mobility or the platform 18 may comprehend a portion of a truck, an enclosed trailer, a van or simply a skid.

At the top of the holding tank 12 is an access port 22 which receives a removable cover 24. The removable cover 24 may be pivotally secured to the holding tank 12 by a hinge (not illustrated), secured by any other suitable means or be fully separable and retained in the access port 22 by gravity and/or a friction fit. The cover 24 permits access to the interior 26 of the holding tank 12 when removed and provides a relatively tight seal to the access port 22 when disposed therein as illustrated in FIG. 3. The access port 22 facilitates the loading of water, grass seed, fertilizer and mulch or any other mixture constituents into the interior 26 of the holding tank 12 as will be readily appreciated.

Figure 2:
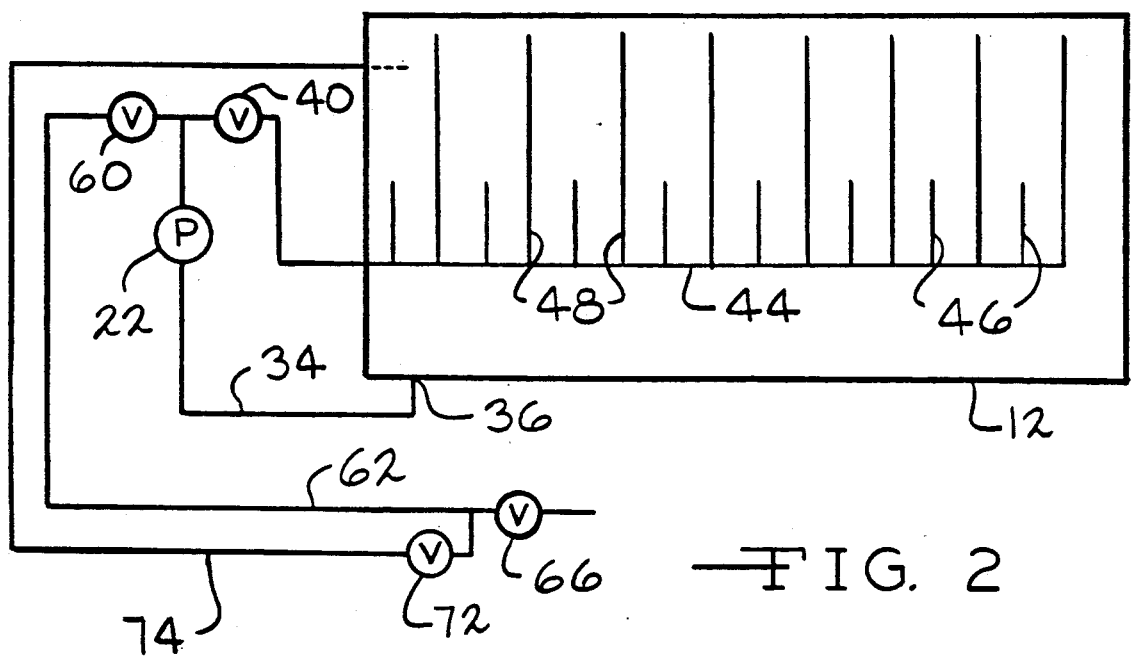
FIG. 2 is a diagrammatic view of the fluid paths and interconnections of a mixing and dispersing apparatus according to the present invention.

With reference now to FIGS. 1, 2 and 3, it will be appreciated that positioned and supported by the platform 18 is a prime mover 30 such as a piston or turbine gasoline engine, or electric A.C. or D.C. motor. Alternatively, if the platform 18 is a portion of a truck, motive power may be derived from the engine of the vehicle (not illustrated), a power take-off or other source. The prime mover 30 is coupled to a centrifugal pump 32. The centrifugal pump 32 is a conventional non-clogging design capable of pumping fluids which are mixtures or suspensions of liquids and particulate material. Coupled to the inlet of the centrifugal pump 32 is a fluid inlet line 34 which is in communication with an outlet fitting 36 disposed at the bottom of the holding tank 12 such that substantially complete withdrawal of the fluid within the interior 26 of the holding tank 12 may be readily accomplished. The outlet of the centrifugal pump 32 communicates with a first T fitting 38 which bifurcates the output flow of the centrifugal pump 32. A first, recirculation valve 40 is disposed in a first fluid line 42 which communicates with a manifold 44 extending along substantially the full length of the holding tank 12. The first valve 40 is preferably of the full port ball valve type construction which offers substantially unimpeded flow to fluid through the valve 40 when it is fully opened.

The manifold 44 communicates with a first plurality of fluid conduits 46 which extend from the manifold 44 to approximately the vertical mid-point of the sidewall of the holding tank 12 and a second plurality of fluid conduits 48 which extend from the manifold 44 to the upper region of the holding tank 12. Each of the first plurality of conduits 46 pass through the wall of the holding tank 12 in a suitable aperture and terminate at a jet or nozzle 52. The nozzles 52 are directed and direct a flow of fluid therethrough in a substantially downward direction parallel to and spaced a short distance from the wall of the holding tank 12. Preferably, the bore or exit diameter of the nozzle is about 1 inch. The second plurality of conduits 48 extending from the manifold 44 pass through a like plurality of apertures in the wall of the holding tank 12 and terminate in a like plurality of jets or nozzles 54. The nozzles 54 are oriented at an angle of approximately 45° to the wall of the holding tank 12 through which they pass. Again, the exit or bore diameter of the nozzles 54 is preferably about 1 inch. Fluid flow from the nozzles 54 is directed downwardly and generally toward the adjacent wall of the holding tank 12. Preferably, the nozzles 54 are disposed above the nominal operating level of fluid within the holding tank 12 such that there exists a vertical interval between the nozzle and the upper surface of the liquid within the holding tank 12. Accordingly, fluid flow from the nozzles 52 and 54 creates circulation in the holding tank 12 about its axis. In FIG. 3, the axis is horizontal and the fluid circulation is clockwise as indicated by the arrows. The axis of the tank may, of course, be vertical, but the circulation pattern will be the same.

Figure 5:
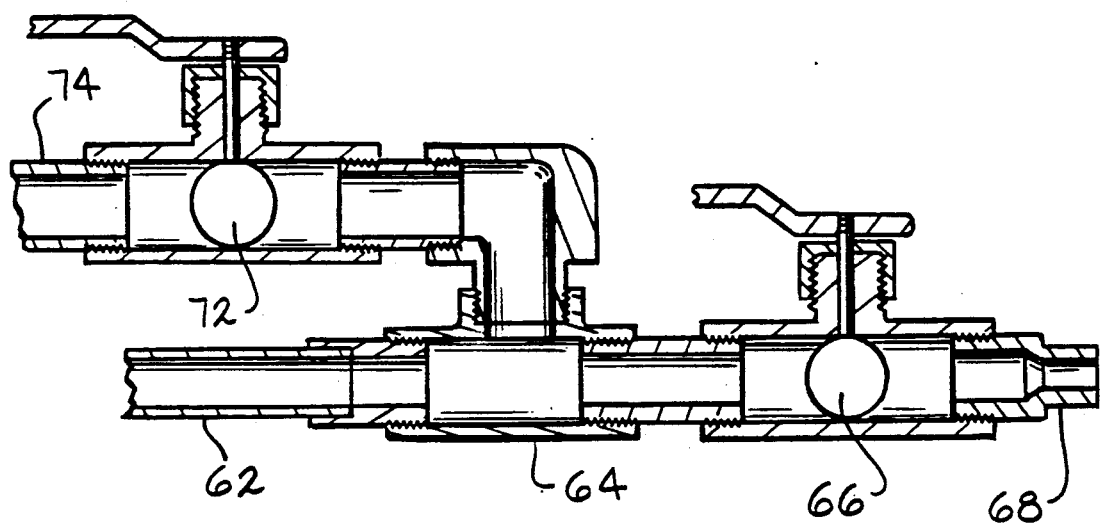
FIG. 5 is an enlarged, sectional view of a nozzle and valve assembly according to the present invention.

Referring now to FIGS. 1, 2 and 5, the output of the centrifugal pump 32 is also provided to a second, supply valve 60. The second valve 60 is likewise a full port valve such as a ball valve and provides adjustable fluid flow to a length of flexible hose 62. The flexible hose 62 terminates in a second T fitting 64. One outlet of the second T fitting 64 communicates with a third, control valve 66. The third valve 66 is again a full port valve such as a ball valve and adjustably controls the flow of fluid through a spray nozzle 68. The second outlet of the second T fitting 64 communicates with a fourth, full port return valve 72. The fourth valve 72 adjustably controls the flow of the mixture through a return line 74 which provides fluid communication between the fourth valve 72 and an inlet fitting 76 in the holding tank 12.

It will be appreciated that adjusting the first, recirculation valve 40, the second, supply valve 60, the third control valve 66 and the fourth return valve 72 controls the flow of the fluid mixture from the holding tank 12 and the mode of operation of the associated components. That is, the first valve 40 may be fully open and the second valve 60 fully closed such that the fluid mixture is fully recycled to the holding tank 12. In this mode, the contents of the holding tank 12 are most expeditiously mixed or maintained uniformly mixed. The second valve 60 controls the volume of fluid flow through the supply hose 62. The greater the second valve 60 is open, the more fluid is provided to the supply hose 62 and vice versa. Preferably, the second valve 60 is adjusted in relation to the first valve 40, that is, the greater the second valve 60 is open to supply the fluid mixture to the supply hose 62, the less the first valve 40 is open and vice versa.

Depending upon the characteristics of the mixture, particularly how fast the constituents settle, a certain level of fluid mixture is constantly recycled through the first valve 40 and the manifold 44 to the holding tank 12. This minimum recirculated flow may be ensured by including a stop (not illustrated) on the first valve 40 which inhibits closing the valve 40 and maintains at least 10% to 30% flow. The third, control valve 66 may be opened or closed to provide fluid to the nozzle 68. The third valve 66 is preferably adjusted in conjunction with the fourth, return valve 72. That is, when the third, control valve 66 is fully open, the fourth, return valve 72 is generally closed and vice versa. Individual adjustment of the valves 66 and 72 facilitate accurate flow and pressure adjustments in the output of the nozzle 68 as will be readily appreciated.

Figure 4:
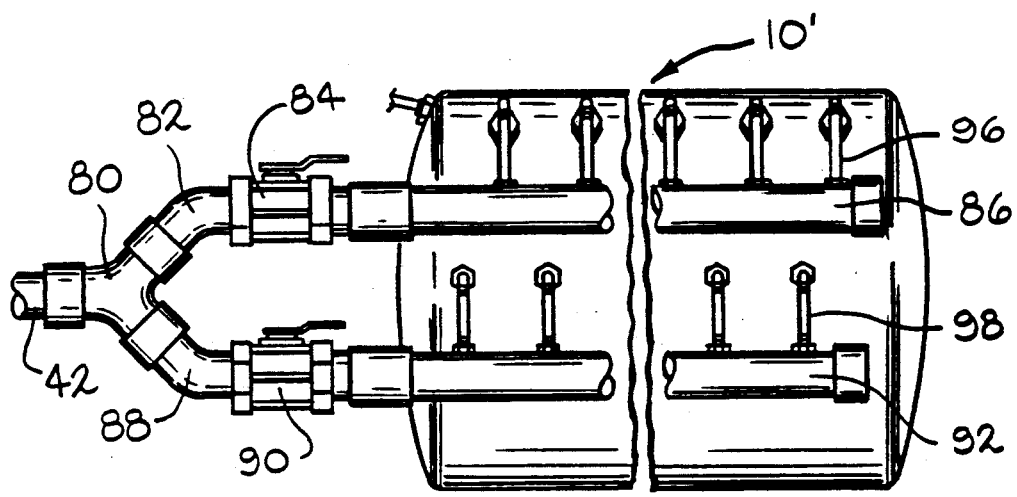
FIG. 4 is a fragmentary, side elevational view, a first alternate embodiment of a mixing and dispersing apparatus.

Referring now to FIG. 4, a first alternate embodiment of the mixing and dispersing apparatus 10 is illustrated and designated 10'. The first alternate embodiment 10' includes a holding tank 12 as well as all additional components illustrated in FIG. 1. The alternate embodiment apparatus 10' is the same in all respects as the apparatus 10 except that the fluid line 42 bifurcates at a Y fitting 80, dividing the outlet flow of the centrifugal pump 32 into a first conduit 82 communicating with a full port valve 84 and, in turn, a first, upper manifold 86. The Y fitting 80 is also coupled to a second fluid conduit 88, a second full port valve 90 and a second, lower manifold 92. The first, upper manifold 86 is coupled to a plurality of fluid conduits 96 which extend through the wall of the holding tank 12 and terminate in nozzles 54 which are identical to the nozzles 54 of the preferred embodiment illustrated in FIG. 3. The nozzles 54 are disposed in the same location relative to the wall of the holding tank 12 and oriented in the same manner. Likewise, the second, lower manifold 92 communicates with a plurality of fluid conduits 98 which extend through the wall of the holding tank 12 and terminate in a respective plurality nozzles 52. The nozzles 52 are identical to the nozzles 52 of the preferred embodiment and are similarly positioned.

In the alternate embodiment apparatus 10', the valves 84 and 90 may be independently adjusted to correspondingly adjust the fluid flows to the upper nozzles 54 and lower nozzles 52. Thus, if it is desired to primarily merely circulate the contents of the holding tank 12, the recirculated flow is directed to the lower manifold 92 by closing off the valve 84 and opening the valve 90. Conversely, if it is desired that the flow be directed to the upper nozzles 54 and the upper manifold 86 to break apart material floating upon the surface of the fluid within the holding tank 12, the upper valve 84 may be opened and the lower valve 90 may be closed.

In operation, the holding tank 12 is first filled with a liquid, preferably to a level below the upper nozzles 54. The quantity of fluid in the holding tank is, of course, primarily related to the size of the batch or project undertaken. With regard to the type of fluid, if the apparatus 10 is to be utilized for hydroseeding or similar agricultural activity, the fluid will generally be water. It will be appreciated however that the apparatus 10 may be utilized with various and diverse fluids and mixtures such as paint, concrete slurries, coatings for acoustic ceilings, plaster and the like. This description refers to hydroseeding and agricultural applications for illustrative purposes only.

A typical hydroseeding batch comprises fifty pounds of mulch per one hundred gallons of water. After the mulch and water have been added through the access port 22, the prime mover 30 and the pump 32 are activated and the first, recirculation valve 40 is fully opened while the second, supply valve 60 is fully closed. Full recirculation flow to the nozzles 52 and 54 causes both energetic circulation of the fluid within the holding tank 12 and breakdown of the clumps and fragments of mulch which will otherwise generally collect and float upon the surface of the water within the holding tank 12. After the mulch and water have been fully mixed, grass seed is added through the access port 22 in the amount of ten pounds per one hundred gallons of water. Fertilizer may also be added at this time, if desired. When the mixture is flowing smoothly, mixing is complete and is ready to be applied to the desired surface.

At this time, the first, recirculation valve 40 is closed to about one-third opening and the second, supply valve 60 is opened. Maintaining the circulation to the holding tank 12 ensures constant agitation and circulation of the mixture within the holding tank 12 thereby maintaining good uniformity and flowability of the mixture from initial withdrawal until the holding tank 12 is empty. The third, control valve 66 may then be opened to provide the desired dispersal rate and the fourth, return valve 72 may be adjusted to adjust the return flow to the holding tank 12 which also adjusts the delivered pressure to the third valve 66 and thus the pressure at the nozzle 68.

Operation of the alternate embodiment apparatus 10' is substantially similar. However, flow rates of the mixture to the lower nozzles 52 and the upper nozzles 54 may be independently adjusted to more rapidly and energetically circulate the contents of the holding tank 12 if the primary flow is through the lower nozzles 52 or provide energy to the upper surface of the fluid and mulch or other material floating on the surface to break it down and assist mixing with the fluid if the primary flow is through the upper nozzles 54.

The foregoing disclosure is the best mode devised by the inventor for practicing this invention. It is apparent, however, that apparatus incorporating modifications and variations will be obvious to one skilled in the art of hydroseeding equipment. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. In an apparatus for mixing and delivering a fluid-based mixture having a cylindrical mixing tank defining an axis, a pump for recirculating and supplying said fluid based mixture and valves for controlling and fluid conduits for delivering said fluid-based mixture, the improvement comprising:
   a manifold extending along at least a portion of the exterior of said tank;
   a first plurality of fluid conduits in communication with said manifold and extending into the interior of said tank; and
   a second plurality of fluid conduits in communication with said manifold and extending into the interior of said tank;
   wherein said conduits have terminal portions for directing fluid flow generally along the wall of said mixing tank to cause circulation within said tank about said axis and said first plurality of conduits extends into said tank at approximately the vertical mid-point and said second plurality of conduits extends into said tank adjacent the top.

2. The improvement of claim 1 wherein said first and said second plurality of conduits are terminated by nozzles.

3. The improvement of claim 1 further including a first valve for controlling the flow of fluid from said pump to said manifold and a second valve for controlling the flow of fluid from said pump to a delivery nozzle.

4. The improvement of claim 1 wherein at least a portion of said nozzles are disposed above the normal fluid level of said tank.

5. The improvement of claim 1 wherein said plurality of fluid conduits are terminated by a respective plurality of nozzles directed substantially parallel to the adjacent wall of said tank.

6. The improvement of claim 1 further including valve means for controlling the flow of fluid supplied to said first plurality of conduits and said second plurality of conduits.

7. In an apparatus for mixing and delivering a fluid-based mixture having a cylindrical mixing tank defining an axis, a pump for recirculating and supplying said fluid based mixture and valves for controlling and fluid conduits for delivering said fluid-based mixture, the improvement comprising:

a first manifold extending along at least a portion of the exterior of said tank;

a second manifold extending along at least a portion of said tank;

a first plurality of fluid conduits in communication with said first manifold and extending into the interior of said tank; and a second plurality of fluid conduits in communication with said second manifold and extending into the interior of said tank, wherein said first and second plurality of conduits have terminal portions for directing fluid flow generally along the wall of said mixing tank to cause circulation within said tank about said axis.

8. An apparatus for mixing and dispersing fluid based mixtures comprising, in combination, a holding tank having an outlet at the bottom and an access port at the top, a pump having an inlet and an outlet, said inlet in fluid communication with said holding tank outlet, a pair of valves in fluid communication with said pump outlet, a first one of said pair of valves in fluid communication with a manifold, a first plurality of conduits extending from said manifold and having openings in the interior of said holding tank at first circumferential locations, a second plurality of conduits extending from said manifold and having openings into the interior of said holding tank at second circumferential locations distinct from and alternating with said first circumferential locations said conduit openings disposed generally parallel to an adjacent wall of said holding tank and a second pair of valves, a first one of said second pair of valves in fluid communication with the other of said first pair of valves and a nozzle for dispersing said fluid-based mixture and the other of said second pair of valves in fluid communication with said first of said second pair of valves and said holding tank.

9. The apparatus of claim 8 wherein said first plurality of conduits extends through said tank at approximately its vertical mid-point and said second plurality of conduits extends through said tank adjacent its top.

10. The apparatus of claim 8 wherein said valves are full flow valves.

11. The apparatus of claim 8 wherein said tank and said pump are mounted upon a vehicle.

12. The apparatus of claim 8 wherein said fluid-based mixture comprises seed, mulch and water.

13. An apparatus for mixing and dispersing fluid-based mixtures comprising, in combination, a holding tank having an outlet at the bottom and an access port at the top, a pump having an inlet and an outlet, said inlet in fluid communication with said holding tank outlet, a pair of valves in fluid communication with said pump outlet, one of said pair of valves in fluid communication with a first manifold and the other of said pair of valves in fluid communication with a second manifold, a first plurality of conduits extending from said first manifold and having openings into the interior of said holding tank at a first vertical level, and a second plurality of conduits extending from said second manifold and having openings into the interior of said holding tank at a second vertical level distinct from said first vertical level.

14. The apparatus of claim 13 further including a second manifold in fluid communication with said second plurality of conduits.

15. The apparatus of claim 13 further including a third valve in fluid communication with said pump outlet and a second pair of valves, a first one of said second pair of valves in fluid communication with said third valve and a nozzle for dispersing said fluid-based mixture and the other of said second pair of valves in fluid communication with the inlet of said first of said second pair of valves and said holding tank.

16. The apparatus of claim 13 wherein said fluid-based mixture comprises seed, mulch and water.

17. The apparatus of claim 13 wherein said holding tank defines an axis and fluid emanating from said nozzles creates circulation about said axis.

18. The apparatus of claim 13 wherein said holding tank and pump are mounted upon a vehicle.

19. In an apparatus for mixing and delivering a fluid-based mixture having a cylindrical mixing tank defining an axis, a pump for recirculating and supplying said fluid based mixture and valves for controlling and fluid conduits for delivering said fluid-based mixture, the improvement comprising:

a manifold extending along at least a portion of the exterior of said tank;

a first plurality of fluid conduits in communication with said manifold and extending into the interior of said tank; and a second plurality of fluid conduits in communication with said manifold and extending into the interior of said tank;

wherein said conduits have terminal portions for directing fluid flow generally along the wall of said mixing tank to cause circulation within said tank about said axis, wherein said first plurality of conduits extends into said tank along a first line and said second plurality of conduits extends into said tank along a second line circumferentially displaced from said first line.

* * * * *